Nov. 13, 1962 A. D. BLOSSER 3,063,417
AUTOMATIC POULTRY WATERER
Filed Feb. 9, 1960
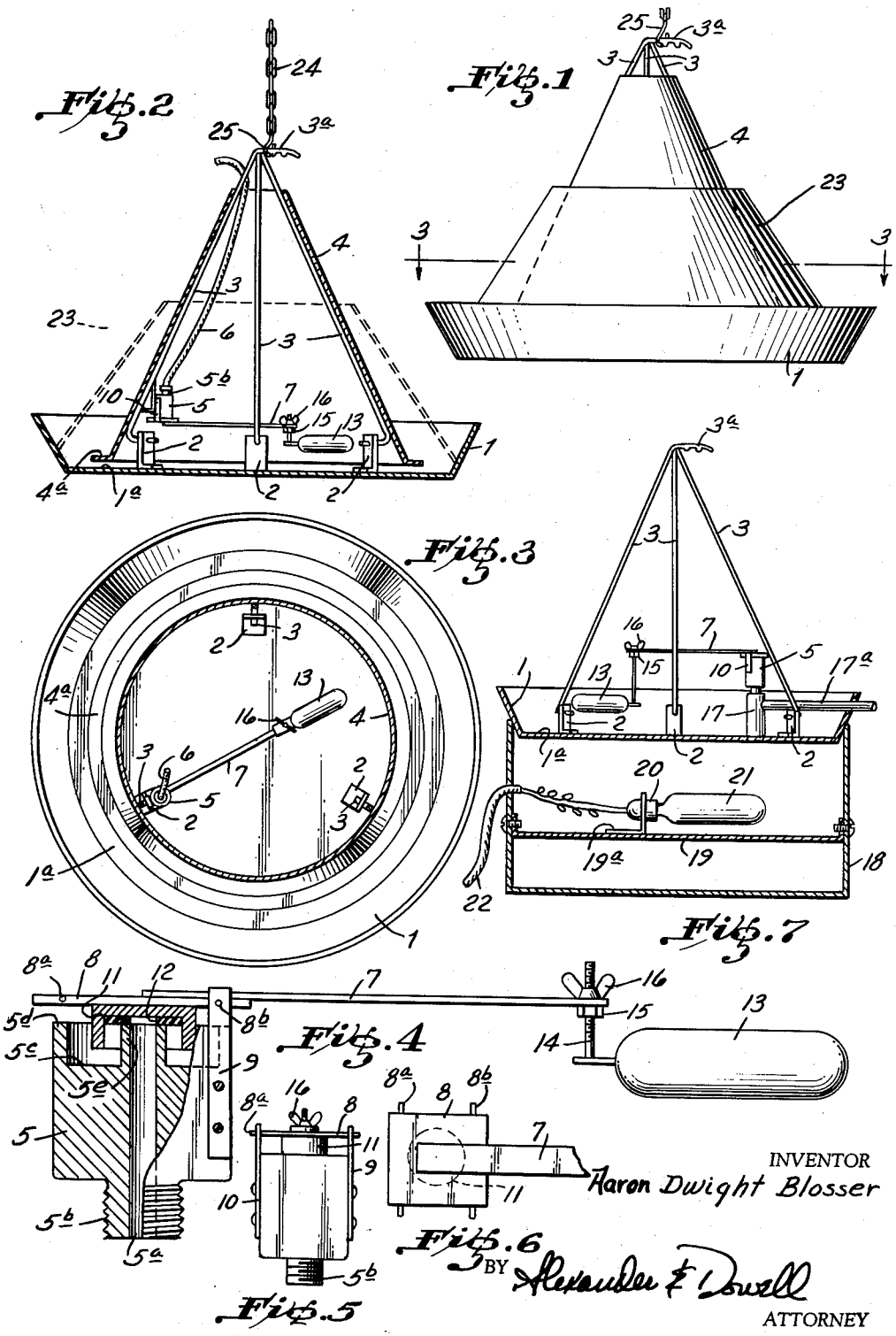
INVENTOR
Aaron Dwight Blosser
BY Alexander & Dowell
ATTORNEY

United States Patent Office 3,063,417
Patented Nov. 13, 1962

3,063,417
AUTOMATIC POULTRY WATERER
Aaron Dwight Blosser, R.R. 2, Wellman, Iowa
Filed Feb. 9, 1960, Ser. No. 7,658
8 Claims. (Cl. 119—79)

This invention relates to poultry waterers, and more particularly relates to poultry waterers wherein the level of the water is automatically maintained by float level means.

It is a principal object of this invention to provide an improved structure for poultry waterers of the type set forth above, and especially to provide a structure which is simplified in structure and at the same time made easier to clean and maintain.

It is another principal object of this invention to provide a poultry waterer which is easily adapted for various sizes of birds, and which can be efficiently used to water poultry ranging in size from the first-day-old chick to birds that are ready for marketing.

Another object of this invention is to provide a waterer having a float valve means which can be assembled in at least two different arrangements, wherein one arrangement provides for a water conduit to enter the waterer vertically downwardly from above, and the other arrangement provides for the entrance of the water conduit from one side or the bottom of the waterer.

Still another object of the invention is to provide in a waterer means for preventing freezing thereof in cold weather.

A further object of the invention is to provide a waterer having a valve arrangement which is designed to prevent spraying or splashing of the water as it enters the waterer through the valve, even though the valve may be held in its wide-open position.

Still further objects include the provision of a durable design, the provision of adjustment means for determining the level of the water in the waterer, and other objects and advantages which will become apparent during the following discussion of the drawing, wherein:

FIG. 1 is a side elevation showing an embodiment of the present invention;

FIG. 2 is a sectional view taken in a vertical plane through the waterer, and showing one of the conical shield members of the waterer illustrated in FIG. 1 in dashed lines, to indicate that the conical shield illustrated thereby may or may not be in use at any particular time;

FIG. 3 is a view partly in section taken along line 3—3 of FIG. 1;

FIG. 4 is an enlarged view of a valve and float assembly, a part of the assembly being shown in cross section;

FIG. 5 is a left end view of the valve assembly shown in FIG. 4, but drawn to a smaller scale;

FIG. 6 is a plan view of the movable portion of the valve assembly shown in FIG. 4, but drawn to a smaller scale; and FIG. 7 is a vertical section view taken through a second embodiment of the invention showing the valve assembly adapted to be connected with the water supply from one side, rather than from above as shown in FIG. 2, FIG. 7 further showing an improved heater means for preventing freezing of the water in cold weather.

Referring now to the drawings, FIGS. 1, 2 and 3 illustrate an embodiment of the waterer including a pan 1 having a plurality of upright brackets 2 secured to the bottom thereof, said brackets each having a hole through the upright portion thereof and each of the holes receiving the hooked lower end of a rod 3. These rods are secured together at their upper ends to form an apex, any suitable means serving to hold the rods together. One of the rods has a bent-over upper end 3a which serves as a handle for the waterer.

A cone 4 having the same angle as the angle between the rods 3 and the bottom of the pan is passed downwardly over the rods and rests thereon with the flange 4a at the lower end of the cone 4 spaced upwardly from the bottom 1a of the pan.

Within the cone 4 and mounted on suitable bracket means just above the bottom 1a of the pan is a float valve assembly, illustrated in greater detail in FIGS. 4, 5 and 6. This assembly comprises a valve body 5 having a bore 5a therethrough and having a threaded end 5b adapted to receive a source of water, such as a garden hose 6. The upper end of the valve body 5 has an annular groove 5c which provides an outwardly extending water deflector 5d and an inner valve seat extension 5e of the bore 5a. The valve assembly also includes moving parts comprising an arm 7 attached to a plate 8 which plate has two sets of spaced pivot pins 8a and 8b, as can best be seen in FIGS. 4 and 6. A pair of upright spaced brackets 9 and 10 are secured to the valve body by any suitable means and have aligned holes at their upper ends for receiving one or the other of the sets of pivot pins 8a or 8b. These upright brackets 9 and 10 are constructed of spring-like material so that they can be sprung apart when engaging or disengaging one or the other of the sets of pivot pins 8a or 8b, thus making it very easy to assemble or disassemble the valve arm 7 with respect to the valve body 5.

When the valve is mounted in the upright position shown in FIGS. 4 and 7, the pivot pins 8b are entered in the holes in the bracket 9 so that when the right end of the arm is raised the valve tends to shut off. However, when the valve is mounted in the inverted position shown in FIGS. 2 and 3 the other set of pivot pins 8a is entered in the holes in the brackets 9 and 10 whereby raising of the right end of the arm 7 in FIG. 2 tends to shut off the supply of water.

The valve closure includes a cup 11 containing a rubber washer 12 so positioned that when the cup 11 is jammed tightly against the seat portion 5e of the valve body, the supply of water is shut off. On the other hand, the cup 11 deflects the water into the annular recess when the water is flowing from the valve so as to reduce the tendency of the water to splatter.

At the outer end of the valve arm 7 is a float assembly comprising a float 13 attached by means of a stud 14 employing a lock nut 15 and a wing nut 16. By changing the position of the nuts 15 and 16 on the stud, the float 13 can be raised or lowered for the purpose of adjusting the water level at which the valve is closed to prevent entry of more water into the pan in a manner well known per se.

Referring now to FIG. 7, an adapter 17 is illustrated including a vertical section and including a horizontal pipe portion 17a adapted to be connected with a source of water. The pipe 17a is illustrated as passing through the side of the pan 1, to which it could be secured, although it is to be understood that the portion 17a may be a short, threaded nipple to which a garden hose 6 can be attached. The adapter 17 is internally threaded to receive the screw portion 5b at the lower end of the valve body 5 for the purpose of supporting the valve assembly as illustrated in FIG. 7. In addition, the lower end of the adapter 17 may be threaded to receive a hose or other source of water through the bottom of the pan, in which case the pipe portion 17a would be capped.

FIG. 7 further illustrates a heater means including a receptacle 18 of the proper diameter to receive the pan 1 of the waterer, the receptacle 18 also having a transversely disposed shelf 19 fitted with a bracket 19a which supports an electric light fixture 20. The light fixture 20 holds a lamp 21 and is connected by wiring 22 to a source of current (not shown) for the purpose of preventing freezing of the waterer. The shelf provides a false bottom on the receptacle and traps a dead-air space therebelow for the purpose of reducing heat transfer from the light bulb 21 to the ground, especially where the ground is wet or covered with snow.

Referring to FIGS. 1 and 2, these figures illustrate an auxiliary frustoconical shield 23 which may be either omitted, or else added to the waterer as illustrated in dashed lines in FIG. 2, for the purpose of preventing small poultry from drowning in the waterer for the first few days after they are hatched.

Both the auxiliary shield 23 and the cone 4 may be raised and/or removed upwardly over the handle portion 3a so that the waterer may be cleaned, or so that the valve assembly may be easily serviced. The waterer may be either set on the ground, or may be supported from above by a chain 24 with a suitable hook 25 at its lower end, which hook engages the handle 3a. There is enough room at the open top of the cone 4 so that the hose 6 may be easily passed into the waterer from above, as illustrated in FIG. 2.

I do not limit my invention to the exact forms shown in the drawing, for obviously changes may be made therein within the scope of the claims.

I claim:

1. A waterer comprising a horizontal pan; a frame of rod-like members joined at their upper ends to form an apex and attached to the bottom of the pan at symmetrically spaced locations and coinciding with the elements of a cone; a downwardly and outwardly tapered substantially conical shield member shaped to fit said cone and be supported on the frame members with the lower periphery of the shield adjacent to and closely spaced off of the bottom of the pan; and water level maintaining means located within said frame and covered by the shield.

2. In a waterer as set forth in claim 1, said frame having supporting handle means at its apex and said shield terminating at an upper opening located below said apex when the shield is in place on the frame.

3. In a waterer as set forth in claim 1, said pan having upwardly and outwardly tapered sides; and an auxiliary shield having downwardly and outwardly tapered surfaces and having an opening in both ends, said auxiliary shield being shaped to meet said tapered sides at a level above the bottom of the pan with said frame extending through the opening in its upper end.

4. In a waterer as set forth in claim 1, said pan being circular and said shield comprising the frustum of a cone.

5. A waterer comprising a horizontal pan; a frame of rod-like members extending above the pan and attached to its bottom; a shield shaped to fit over said frame and be supported thereon with its lower periphery adjacent to and spaced just above the bottom of the pan; and water level maintaining means located within said frame, said means comprising a valve body having a bore therethrough and having a water inlet at one end and a valve seat at the other end, the body having an annular groove around the seat and extending inwardly of the body parallel with the axis of the bore, a cup-shaped valve member overlying the seat and extending into the groove to deflect the flow of water thereinto; an arm pivotally attached to the body and supporting the cup-shaped valve member; and float means on the arm for closing the valve member against the seat in response to fitting of the pan to the proper water level.

6. In a waterer as set forth in claim 5, bracket means connected with the valve body and laterally offset from the seat and having pivot holes therethrough, and said arm having two sets of pivot pins disposed transversely thereof and on opposite sides of the valve member whereby one set of pivot pins is engaged in said pivot holes when the valve body is mounted with the seat facing vertically downwardly and the other set of pivot pins is engaged in said pivot holes when the valve body is mounted with the seat facing vertically upwardly.

7. In a waterer as set forth in claim 5, adjustment means connecting said float means with said arm and supporting the two in adjustable spaced relation.

8. In a waterer as set forth in claim 5, heater means to prevent freezing of the water, comprising a receptacle shaped to receive the lower portion of said pan and to support the latter above the bottom of the receptacle, a shelf in the receptacle dividing the space between the pan and the bottom of the receptacle; and electric heater means supported on top of said shelf beneath said pan.

References Cited in the file of this patent

UNITED STATES PATENTS

| | | |
|---|---|---|
| 1,331,008 | Force | Feb. 17, 1920 |
| 1,816,781 | Johnston | July 28, 1931 |
| 1,929,789 | Olson | Oct. 10, 1933 |
| 2,298,398 | Marshaus | Oct. 13, 1943 |
| 2,356,982 | East | Aug. 29, 1944 |
| 2,435,015 | Olson | Jan. 27, 1948 |
| 2,503,886 | Olson | Apr. 11, 1950 |
| 2,530,922 | Townsend | Nov. 21, 1950 |
| 2,692,579 | Overby et al. | Oct. 26, 1954 |
| 2,904,004 | Bruns et al. | Sept. 15, 1959 |